R. SCHMITZ.
BRAKE.
APPLICATION FILED FEB. 7, 1919.
1,344,598.
Patented June 22, 1920.
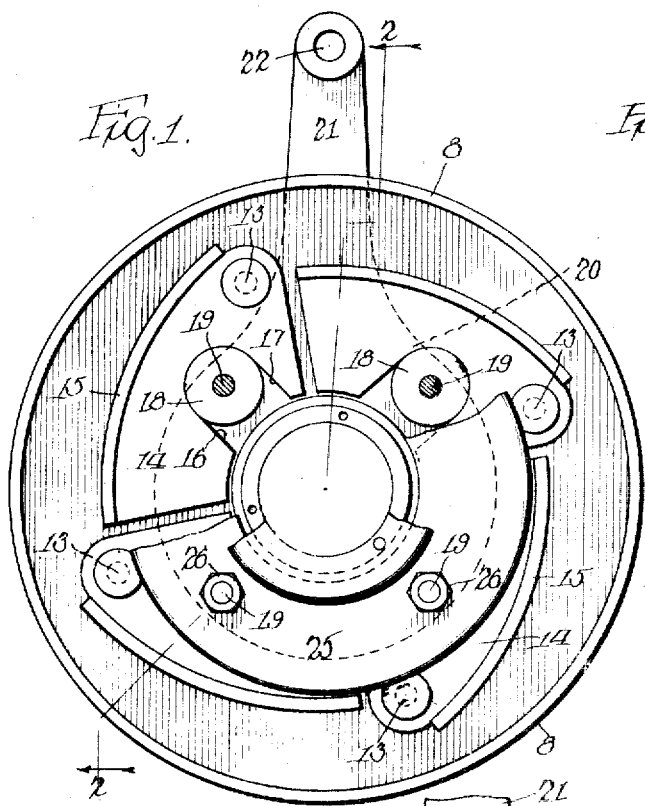
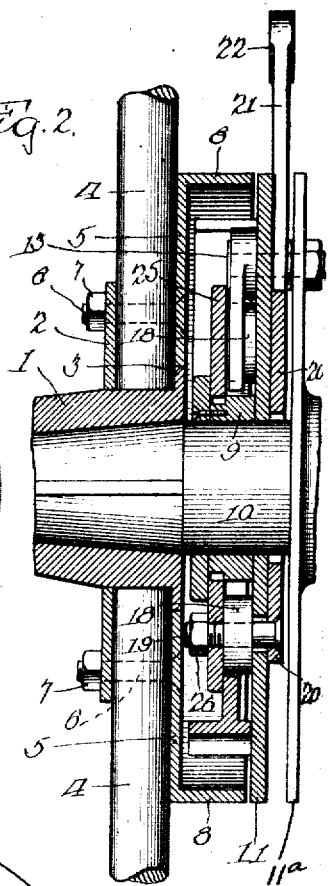
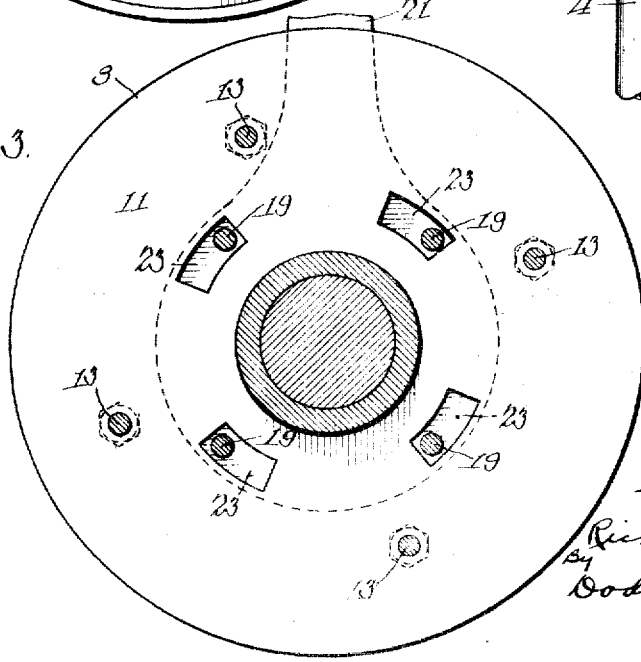
Inventor
Richard Schmitz
By Dodson and Roe
Attys.

UNITED STATES PATENT OFFICE.

RICHARD SCHMITZ, OF CHICAGO, ILLINOIS.

BRAKE.

1,344,598.	Specification of Letters Patent.	Patented June 22, 1920.

Application filed February 7, 1919. Serial No. 275,494.

*To all whom it may concern:*

Be it known that I, RICHARD SCHMITZ, a citizen of the United States, residing at Chicago, in the county of Cook and State of Illinois, have invented a certain new and useful Improvement in Brakes, of which the following is the specification.

My invention relates primarily to brakes for automobiles, though it will be apparent from the hereinafter contained description that it may be applied to other devices as well as automobiles.

The particular character of the device is a specific application of the principle described in my co-pending application, Serial No. 275,492, and is an application of the same to a brake in which conditions are slightly different from those presented by a clutch.

It is well known that brakes for automobiles are not only a constant source of annoyance, but that they, in a very short time, drag, thereby increasing the requirements for power to propel the vehicle; also it is well known that they require considerable power to be exerted upon the brake pedal to produce enough friction to bring the car to a stop.

My invention has for its object to provide a device which can be entirely inclosed in the brake drum and which will be practically dirt and dust proof, the construction of which will be such as to tremendously increase the gripping power so that a very slight pressure upon the brake pedal will practically lock the wheel; at the same time, the engagement of the friction devices with the flange of the brake drum, will be very gradual, so that the brake will not seize, and also to provide a construction whereby the friction devices will effectually resist the wear, and in which the wearing will be more uniform upon the parts than any of the brakes with which I am familiar.

My means of accomplishing the foregoing objects may be more readily understood by having reference to the accompanying drawings which are hereunto annexed and are a part of the specification, in which:

Figure 1 is a side elevation of my improved brake.

Fig. 2 is a vertical sectional view taken on the line 2—2 in Fig. 1 in the direction indicated by the arrows, a fragmentary portion of a wheel being shown in connection therewith.

Fig. 3 is a view of the opposite side of the device from that shown in Fig. 1, the spokes of the wheel being omitted for clearness.

Similar reference numerals refer to similar parts throughout the entire description.

As shown in the drawings, 1 is the hub of the wheel, which is provided with the usual flanges 2 and 3, intermediate of which are mounted the spokes 4. The brake drum 5 is secured to the spokes and flanges by means of bolts 6 and nuts 7 in the usual manner. The brake drum is provided with a laterally extending flange 8. A hub 9 is mounted on the sleeve 10 and is provided with an outwardly extending flange 11 which is preferably made the same diameter as the outside diameter of the brake drum 5. Any suitable anchoring means such as a plate 11ª may be secured stationary to some suitable housing or other part of the device with which the wheel rotates and the said plate 11ª as shown is attached to the flange 11 by means of one of the stud bolts which extends through the said plate 11ª as shown. The sleeve 10 is stationary and may be integral with or attached to the plate 11ª. This flange is provided with a plurality of such stud bolts 13 upon which are pivotally mounted the friction engaging devices 14 which are provided with arcuate frictional surfaces 15 and a U-shaped recess, the sides 16 and 17 of which form bearing surfaces for rollers 18, mounted upon stud bolts 19, which are carried by a plate 20, which has projecting outwardly therefrom, a lug 21, which is provided with a bearing 22 adjacent its end for engagement with the links of the brake pedal (not shown). As shown in the drawings, the plate 20 has an aperture larger in diameter than the hub to which it is applied and, therefore, the said plate may move eccentrically to the hub. The stud bolts 19 extend through slots 23 formed in the flange 11 so as to permit the plate 20 to be rotated and carry with it the stud bolts 19.

An annular plate 25 is provided on the opposite side of the device through which the stud bolts 19 pass, nuts 26 serving to clamp the mechanism securely together. The plate 25, at its inner edge, is in spaced relation to the hub and the slots 23, as clearly indicated in the drawings, are wider than the diameter of the stud bolts 19. This results in a construction which permits an eccentric movement of the plate 20 and the rollers carried by the stud bolts 19, thus permitting the frictional engaging surfaces to compensate for any irregularities of the braking surface and will also compensate to considerable extent for irregularities caused by wear.

The operation of the device is as follows:

It will be apparent from the hereinbefore contained description that the movement of the lug 21 of the plate 20 serves to rotate it, and this rotation carries with it, the stud bolts 19, which causes the rollers to engage the bearing surface 16 on the frictional devices 14, and causes them to move outwardly and to engage the inner surface of the flange 8 of the brake drum 5, while the reverse movement serves to bring the rollers in contact with the bearing surfaces 17 and retract the frictional devices so that they are entirely out of contact with the flange 8 of the brake drum thereby leaving the wheel free to run without any possibility of the brake dragging thereon.

It will be apparent from the foregoing that changes may be made in the details of construction which will be within the scope of my invention, but I do not desire to be limited thereto, except as such limitations appear in the hereinafter contained claims.

It will also be apparent from the foregoing that I do not rely upon springs to bring the frictional devices out of contact with the flange of the brake drum, but that they are mechanically and positively moved out of engagement therewith.

Having described my invention what I regard as new and desire to secure by Letters Patent is:

1. The combination with a brake drum of a plurality of frictional devices contained therein, a plate, pivots carried by the plate in which the friction devices are oscillatable, rotatable means engaging each friction device at one side of its pivot to cause said frictional devices to move outwardly when said means are bodily moved in one direction, to retract them when said means are bodily moved in the opposite direction, and means rotatable about the axis of the brake drum for carrying the rotatable means, and means for anchoring the plate stationary with relation to the brake drum.

2. The combination with a brake drum of a plate, a plurality of frictional devices pivotally mounted on the said plate having arcuate frictional surfaces adapted to engage the flange of the brake drum, there being a U-shaped recess in said frictional devices, a rotatable plate having stud bolts mounted therein, said bolts passing through slots formed in the first named plate, rollers mounted upon said stud bolts which engage the sides of said U-shaped recesses, a radially extending lug on said rotatable plate, an annular plate on the opposite side of the devices having openings thereon through which the said stud bolts pass, nuts mounted on said stud bolts to hold said plates in position, and means for anchoring the plate stationary with relation to the brake drum.

3. The combination with a brake drum, of a hub, a plate, a plurality of frictional devices pivotally mounted on the said plate having arcuate frictional surfaces adapted to engage the flange of the brake drum, there being a U-shaped recess in said frictional devices, a rotatable plate having stud bolts mounted therein, said bolts passing through slots formed in the first named plate, rollers mounted upon said stud bolts which engage the sides of said U-shaped recesses, a radially extending lug on said rotatable plate, an annular plate on the opposite side of the devices having openings thereon through which the said stud bolts pass, nuts mounted on said stud bolts to hold said plate in position, and means for anchoring the plate stationary with relation to the brake drum.

4. The combination with a brake drum of a plate, a plurality of frictional devices pivotally mounted on the said plate having arcuate frictional surfaces adapted to engage the flange of the brake drum, there being a U-shaped recess in said frictional devices, a rotatable plate having stud bolts mounted therein, said bolts passing through slots formed in the first named plate, rollers mounted upon said stud bolts which engage the sides of said U-shaped recesses, a radially extending lug on said rotatable plate, an annular plate on the opposite side of the devices having openings thereon through which the said stud bolts pass, the inner edge of said annular plate being in spaced relation to the hub, nuts mounted on said stud bolts to hold said plates in position, and means for anchoring the plate stationary with relation to the brake drum.

5. The combination with a wheel, of a brake drum secured thereto, a hub, a plate, a plurality of frictional devices pivotally mounted on the said plate having arcuate frictional surfaces adapted to engage the flange of the brake drum, there being a U-shaped recess in said frictional devices, a rotatable plate having stud bolts mounted therein, said bolts passing through slots formed in the first named plate, rollers mounted upon said stud bolts which engage the sides of said U-shaped recesses, a radially extending lug on said rotatable plate, an annular plate on the opposite side of the devices having openings thereon, through which the said stud bolts pass, the inner edge of said annular plate being in spaced relation to the hub, nuts mounted on said stud bolts to hold said plates in position, and means for anchoring the plate stationary with relation to the brake drum.

6. The combination with a wheel, of a brake drum secured thereto, a hub, said hub being fixed against rotation, a plate, a plurality of frictional devices pivotally mounted on the said plate having arcuate frictional surfaces adapted to engage the flange of the brake drum, there being a U-shaped recess in said frictional devices, a rotatable plate having stud bolts mounted therein, said bolts passing through slots formed in the first named plate, rollers mounted upon said stud bolts which engage the sides of said U-shaped recesses, a radially extending lug on said rotatable plate, an annular plate on the opposite side of the devices having openings thereon through which the said stud bolts pass, the inner edge of said annular plate being in spaced relation to the hub, nuts mounted on said stud bolts to hold said plates in position, and means for anchoring the plate stationary with relation to the brake drum.

In testimony whereof I have signed the foregoing specification.

RICHARD SCHMITZ.